Feb. 17, 1953 R. D. COLMERY 2,628,446
REEL-RECEIVING FISHING ROD HANDLE
Filed Oct. 26. 1948

Inventor
Robert D. Colmery
By W. S. McDowell
Attorney

Patented Feb. 17, 1953

2,628,446

UNITED STATES PATENT OFFICE 2,628,446

REEL-RECEIVING FISHING ROD HANDLE

Robert D. Colmery, Columbus, Ohio

Application October 26, 1948, Serial No. 56,554

6 Claims. (Cl. 43—22)

The present invention relates generally to fishing tackle, and in its more specific aspects to fishing rod handles of the type provided with a reel-seating region, a hand-gripping portion, and a reel clamping mechanism for securely but removably holding the base of a reel within the reel-seating region of the rod handle.

It is the primary object of this invention to provide a fishing rod handle which embodies a positive reel-retaining mechanism adapted to securely clamp the base of a casting or similar reel to the handle, the construction permitting of the insertion of the reel within or detachment thereof from the reel-seating portion of the handle by merely applying backward pressure upon the reel with one hand, while holding the handle structure stationary with the other hand.

It is another object of this invention to provide a fishing rod handle embodying a hand-gripping portion in which is formed a longitudinal chamber opening toward the reel-seating region of the handle, and in which is positioned a resiliently compressible member adapted to engage and hold the heel extension of the base of a a fishing reel, the resiliently compressible member being provided with a tapered undercut socket or indentation disposed adjacent the reel-seating region of the handle to receive the heel extension of various sizes of standard type reels.

It is still a further object of this invention to provide a fishing rod handle to which an associated casting reel may be quickly attached or detached simply by inserting the heel extension thereof within a cavity formed in the handle structure, forcing the reel backwardly, and thereafter inserting the toe extension of the reel base within a second cavity formed at the forward portion of the reel-seating recess of the handle.

For a further and more complete understanding of the present invention and the various additional objects and advantages realized therefrom, reference is made to the following description and the accompanying drawings wherein.

Figure 1:
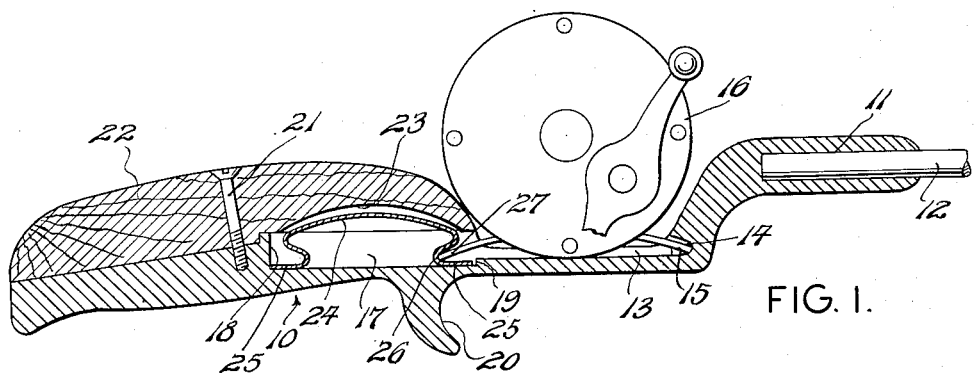
Fig. 1 is a longitudinal vertical sectional view taken through a fishing rod handle formed in accordance with the present invention.

Referring now particularly to Fig. 1 of the drawing, the fishing rod handle disclosed therein comprises a handle base member, generally designated by the numeral 10, and preferably formed from a suitable lightweight material, such as aluminum, magnesium or alloys thereof, and formed at its forward end with a socket 11 for the reception of the inner end of the shaft 12 of the fishing rod.

The base member 10 is provided intermediate its ends with a relatively flat and recessed reel-seating region 13, the forward end of which is contiguous to a tapered undercut socket 14 adapted to receive the toe portion 15 of a standard type casting reel 16.

Contiguous to the rearward end of the reel-seating region 13, the handle body 10 is formed with a longitudinally extending chamber 17 which is defined at one end by a rearwardly disposed abutment wall 18, and at its opposite end by a relatively shallower forward wall 19. In the usual manner, the body member 10 is provided with an integral finger-gripping projection 20 which provides a gripping region for the index finger of the hand.

Secured to the upper surface of the handle base member 10, rearwardly of the reel-seating region thereof, as by means of a threaded bolt 21, is a rounded and smooth upper handle member 22, preferably formed from hard wood, a suitable synthetic resinous material, or cork.

The lower mating face of the upper handle member 22 is provided with an arcuate recess 23 in registration with the rectangular recess or chamber provided in the base member of the handle.

Occupying the rectangular recess 17 formed in the base held within the recess of the handle by nature of the abutting engagement between the outwardly projecting legs thereof and the forward and rear walls or shoulders 18 and 19 defining the end walls of the recess 17. The reversely curved region of the bow spring, toward its forward end, provides a tapered socket 26 which opens toward the reel-seating region of the handle, and into which the heel 27 of the reel base may be inserted to lock the reel 16 to the handle.

Figure 2:
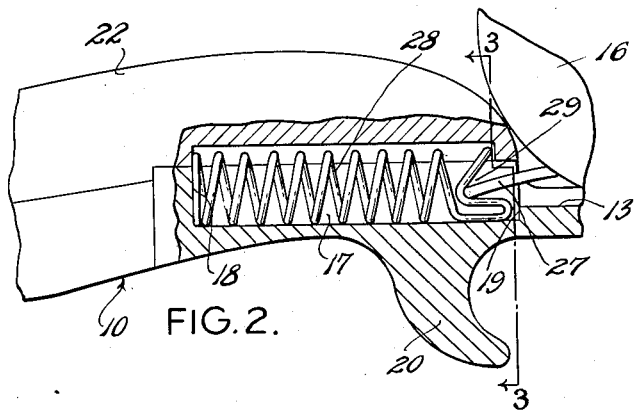
Fig. 2 is an enlarged fragmentary vertical sectional view taken through a modified form of fishing rod handle.
Figure 3:
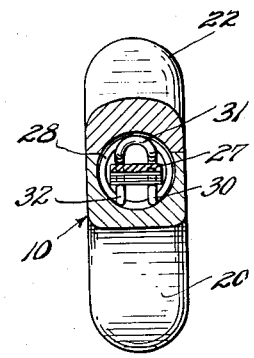
Fig. 3 is a transverse vertical sectional view taken along the line 3—3 of Fig. 2.
Figure 4:
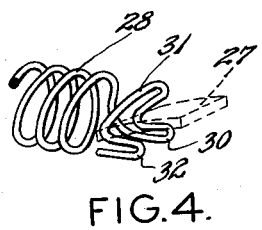
Fig. 4 is a detailed fragmentary perspective view of the spring mechanism embodied in the fishing rod handle disclosed in Figs. 2 and 3.

Referring to Figs. 2 and 3 of the drawing, wherein is disclosed a modified form of resiliently compressible means which comprises a coil spring 28 positioned within the chamber or recess 17 between the handle base member 10 and the upper handle member 22. The coil spring 28, at its rearward end is provided with a flat base convolution which is maintained in abutting relation to the rearward wall 18 of the chamber, and is formed at its forward end with an inwardly tapered socket frame 29 for the reception of the heel 27 of the reel base. The socket member 29 is formed by bending the outer end portion of the coil spring backwardly upon itself to form an outwardly projecting leg 30, as shown particularly in Fig. 4 of the drawing, and then upwardly in an arcuate loop 31 which is disposed in acutely angular relation to the leg 30. The socket member 29 terminates in a second outwardly projecting leg 32 corresponding to the leg 30. Each of the outwardly projecting legs 30 and 32 engage the forward wall or abutment 19 of the recess to maintain the spring within the chamber of the handle.

This modification, as shown in Figs. 2 and 3 functions in the same manner as the bow spring disclosed in Fig. 1 in that the same is resiliently compressible in response to the insertion of the heel 27 of a reel base within the forward socket member thereof, such resilient compression serving to force the reel base forwardly of the handle member to positively engage the toe 15 thereof with the forward recess or socket 14 of the handle.

In operation, with respect to all forms of the present invention disclosed in the drawing, the reel 16 is attached to the handle first by inserting the heel 27 of the reel base within the opening provided between the reel-seating region 13 and the internal chamber 17 formed in the hand-gripping section. The heel 27 thus engages the socketed forward end of the spring, and by applying rearwardly directed pressure to the reel 16, the spring may be compressed to permit of the insertion of the toe 15 within the forward socket 14 of the handle. By releasing the backwardly applied pressure upon the reel, the spring urges the reel base forwardly of the reel-seating region to insert the toe thereof within the forward socket 14. The undercut configuration of the forward socket 14 and the socket of the spring prevents upward withdrawal of the heel and toe portions of the reel base without first displacing the reel base rearwardly of the handle to withdraw the toe portion from the forward socket 14.

To detach the reel from the handle, it is merely necessary to exert backwardly applied pressure to the reel to compress the associated spring, and to withdraw the toe portion 15 from the forward socket 14. At this time, the reel may be lifted upwardly out of engagement with the reel-seating region.

In view of the foregoing, it will be seen that the present invention provides a structurally simple yet mechanically efficient fishing rod handle construction which is adapted to receive a standard type fishing reel, and which embodies resiliently compressible means to firmly lock such reel in a seated position on the handle. Handles formed in accordance with the present invention are characterized by their ability to receive the reel base and lock the same to the reel-seating region thereof merely by the application of backwardly applied hand pressure to the reel.

While present preferred embodiments have been disclosed in detail it will be manifest that various modifications with regard to design and construction may be made without departing from the spirit and scope of the invention.

I claim:

1. In a fishing rod handle having a reel-seating region, an undercut socket contiguous to one end of the reel-seating region for the reception of one end of a reel base to be attached to said handle, and a hand-gripping member disposed adjacent to the opposite end of the reel-seating region and provided with an internal chamber opening toward the reel-seating region; a compression spring carried within the chamber of the hand-gripping member and formed at one end with an integral inwardly tapered socket for the reception of the opposite end of the reel base to be attached to said handle, said spring being compressible within the chamber of the hand-gripping member in response to forces applied to the socket thereof through the end of the reel base being attached or detached from said handle.

2. In a fiashing rod handle having a reel-seating region and a hand-gripping portion provided with an internal chamber opening onto the reel-seating region; a compression spring occupying the chamber of the hand-gripping portion and formed with an integral inwardly tapered head portion adjacent the reel-seating region for the reception of one end of a reel base to be attached to said handle, said spring being compressible within the hand-gripping portion in response to forces applied to the head portion thereof in a direction from the reel-seating region toward the hand-gripping portion by the end of the reel base being attached to or detached from said handle.

3. In a fishing rod handle having a reel-seating region thereon and a hand-gripping portion adjacent one end of the reel-seating region and formed with an internal chamber opening onto the reel-seating region; a resiliently compressible member carried within the chamber of the hand-gripping portion and enclosed thereby and formed with an integral inwardly tapered socket for the reception of an end of a reel base to be seated on the reel-seating region of said handle, the socket of said compressible member being disposed adjacent one end of the reel-seating region and movable inwardly of the hand-gripping portion in response to forces applied thereto by an end of the reel base being seated on the reel-seating region of said handle.

4. In a fishing rod handle having a recessed reel-seating region formed at one end with an undercut socket for the reception of one end of a reel base to be seated on said region; a hand-gripping member disposed at the opposite end of the reel-seating region and formed with an internal chamber communicating with the reel-seating region, and a resiliently compressible bow spring mounted within the chamber of the hand-gripping member and formed at one end with an undercut socketed portion disposed adjacent to the reel-seating region to receive the opposite end of the reel base to be seated on the reel-seating region of said handle, said spring being compressible with said hand-gripping member in response to forces applied to the socketed end portion thereof by an end of the reel base to be seated on the reel-seating region of said handle.

5. In a fishing rod handle having a recessed reel-seating region formed at one end with an undercut socket for the reception of one end of a reel base to be seated on said region; a hand-gripping member arranged at the opposite end of the reel-seating region and provided with an internal chamber opening onto the reel-seating region opposite to the socket thereof, and a resiliently compressible coil spring mounted within the chamber of said hand-gripping member and formed at one end with an integral socket-forming frame enclosed by said hand-gripping member and disposed adjacent to the reel-seating region to receive the opposite end of the reel base to be seated on the reel-seating region of said handle, said spring being compressible within said hand-gripping member in response to forces applied to the socket-forming frame thereof by an end of the reel base being attached to or detached from said handle.

6. A fishing rod handle comprising a body formed with an inwardly depressed reel-seating region adapted for the removable reception of a line-carrying reel, said reel being of the type having a base formed with oppositely extending heel and toe mounting extensions, the reel-seating region of the handle being provided forwardly thereof with a holding socket for the reception of the toe extension of the reel base, the body of said handle to the rear of said heel-seating region being formed with an internal longitudinally extending chambers which communicates at its forward end with said region and an abutment shoulder arranged substantially at the forward end of said chamber, the said forward end of said chamber being adapted to receive the heel extension of the reel occupying said seating region, a spring member positioned entirely within the confines of said chamber, said spring member at the rear end thereof engaging with the body of said handle at the rear end of said chamber, the forward end of said spring member being resiliently movable toward and away from the shoulder provided at the forward end of said chamber, and the forward end of said spring member being provided with a seating indentation for the reception of the heel extension of the associated reel base, said spring member being compressible in response to forces applied thereto through the end of the reel base being seated on or detached from the reel-seating region to permit of the insertion or withdrawal of the toe extension of said reel into or from the forwardly disposed socket of said handle.

ROBERT D. COLMERY.

REFERENCES CITED

The following references are of record in the file of this patent:

UNITED STATES PATENTS

| Number | Name | Date |
|---|---|---|
| 1,955,648 | Nickler | Apr. 17, 1934 |
| 2,003,893 | La Pan | June 4, 1935 |
| 2,078,033 | Six | Apr. 20, 1937 |
| 2,443,567 | Moulton | June 15, 1948 |
| 2,485,144 | Espenship | Oct. 18, 1949 |

FOREIGN PATENTS

| Number | Country | Date |
|---|---|---|
| 8,582 | Great Britain | of 1891 |
| 12,754 | Great Britain | of 1900 |